April 17, 1928.  
W. M. SWEET  
DIRIGIBLE HEADLIGHT  
Filed Jan. 29, 1927  
1,666,867  
2 Sheets-Sheet 1

INVENTOR.  
W. M. Sweet.  
BY  
L. N. Gillis  
ATTORNEY.

April 17, 1928.  1,666,867
W. M. SWEET
DIRIGIBLE HEADLIGHT
Filed Jan. 29, 1927   2 Sheets-Sheet 2

Inventor
W. M. Sweet
BY
L. N. Gillis   ATTORNEY.

Patented Apr. 17, 1928.

1,666,867

UNITED STATES PATENT OFFICE.

WILLIS M. SWEET, OF NILES, MICHIGAN.

DIRIGIBLE HEADLIGHT.

Application filed January 29, 1927. Serial No. 164,603.

This invention relates to dirigible headlights for automobiles and has special reference to improvements in the operating mechanisms for such lights, the operating mechanisms being of the general class shown and described in my prior Patent No. 1,599,689, dated September 14, 1926, and in my application for patent on dirigible headlights filed December 7, 1926, Ser. No. 153,160.

As pointed out in the specification of my copending application aforesaid, in the usual construction of dirigible head lights which are connected to the steering gear in such manner that the angle of direction of the head light corresponds to the angle at which the steering wheels are set in turning, difficulty is experienced because the head light does not turn quickly enough to show the side of the road to which the vehicle is about to move and where the wheels are set at a small angle, the beam from such head light strikes the side of the road so far in advance of the position of the car that the car may run entirely off the road without the operator being aware of his danger.

The principal object, therefore, of the present invention is to provide an improved mechanism whereby a dirigible head light may be so connected to the steering mechanism of the automobile that a slight movement of such steering mechanism will cause the beam of the head light to move quickly to the proper side of the road, the mechanism being so arranged that the wheels may be swung further by the usual steering mechanism without causing further movement of the head light beam. In other words, the actuating mechanism of the head light causes the beam from the latter to move in the desired direction in advance of the movement of the wheels to its extreme position, the wheels being afterward capable of also moving to extreme angular position.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1:
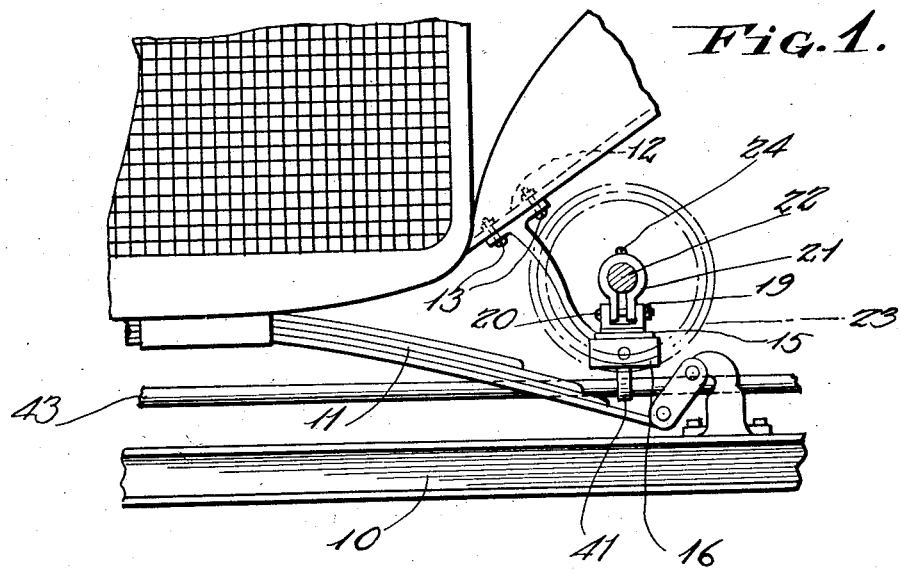
Figure 1 is a front view of a portion of an automobile showing the improved mechanism mounted thereon, the outline of the head light being indicated in the dotted lines in order to better show the mounting of the mechanism.
Figure 2:
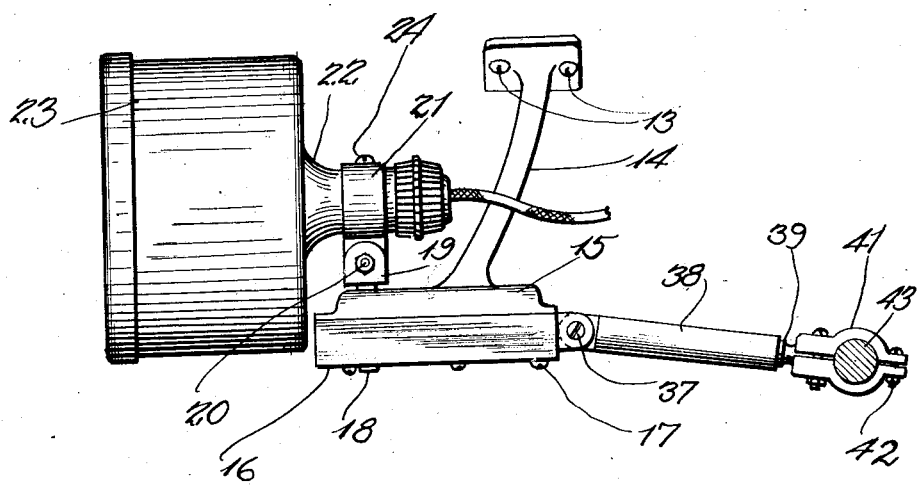
Figure 2 is a side elevation thereof.
Figure 3:
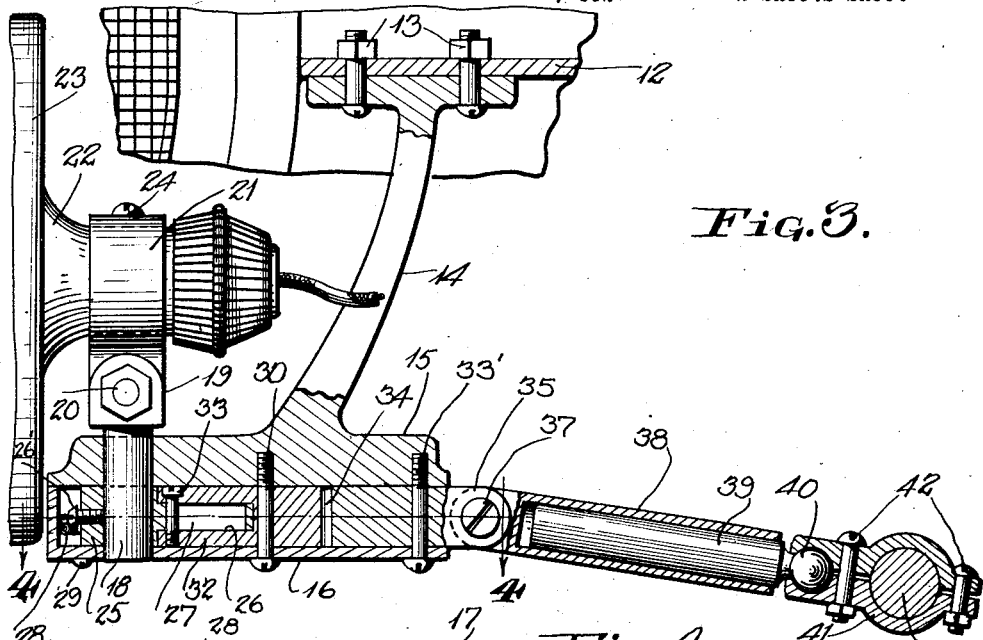
Figure 3 is a vertical longitudinal section through the mechanism and drawn to an enlarged scale.

As here illustrated there is shown one embodiment of the invention especially adapted for use on low head lights such as are located closely above the front axle 10 of the automobile. As is usual this front axle is supported beneath the body of the automobile by a spring 11 and the automobile is provided with fenders one of which is indicated at 12. Secured to the under side of the fender 12 by means of bolts 13 is a bracket 14 carrying on its lower end a casing 15 open at the bottom and provided with a bottom closure 16 secured to the casing by bolts or screws 17. Journaled in the casing 15 and cover 16 is a lamp opening pin or shaft 18 which is vertically positioned and has a forked upper end 19 where through passes a clamping bolt 20 carrying a clamp band 21 which surrounds the neck or shank 22 or a drum-type head light or spot light 23. Obviously, while a drum-type light has here been shown other types may also be used. The shank 22 is secured in the band 21 by a set screw 24. With this arrangement the head light may be swung to right or left on the vertical axis of the shaft 18 and may be adjusted for throwing its beam at the proper vertical point by rotating the band 21 on the bolt 20. Within the casing 15 there is fitted on the shaft 18 a hub 25 which is secured in adjusted position on the shaft by means of a set screw 26' so that the lamp can be manually adjusted for lateral directions of the beam while the hub 25 is held stationary. This hub is provided with a rearwardly extending tongue 26 having a slot 27 therein and a double ended spring 28 supported on pins 29 has its ends pressing against opposite sides of the tongue 26 so as to hold the slot 27 normally in position directly behind the axis of the shaft 18.

The casing 15 also supports a shaft 30 whereon is mounted a segmental gear 31, the gear extending about 180 degrees and being provided with a fork 32 embracing the tongue 26 and carrying a pin 33 which passes through the slot 27. A further shaft 33′ is carried by the casing 15 paralleled to and rearwardly of the shaft 30 and on this shaft 33′ is mounted a segmental gear 34 which meshes with the gear 31 and is provided with a pivot lug 35 extending rearwardly of the casing through an opening 36 made in said casing. This pivot lug is provided with a horizontal opening wherethrough passes a pivot pin 37 on which is pivoted the front end of a telescope sleeve 38 which can thus swing in a vertical position. Slidably mounted in the telescope sleeve 38 is a telescope pin 39 which projects rearwardly from the sleeve 38 and is connected by a ball and socket joint 40 with a clamp collar 41 adapted to be clamped by bolts 42 on the tie bar 43 of the automobile steering mechanism, this tie bar being that commonly used to connect the steering knuckles of the front wheels.

It will be obvious that the clamp members 41 and screws 42 constitute a securing device for connecting the mechanism to the steering mechanism of a car.

Figure 4:
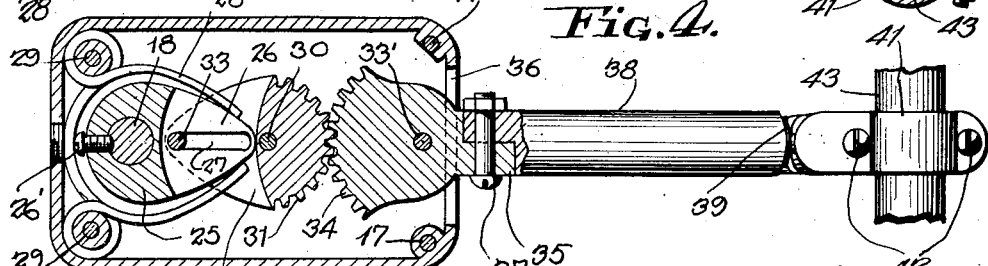
Figure 4 is a section on the line 4—4 of Figure 3 with the parts shown in the position assumed when the head light is directing its beam straight ahead.
Figure 5:
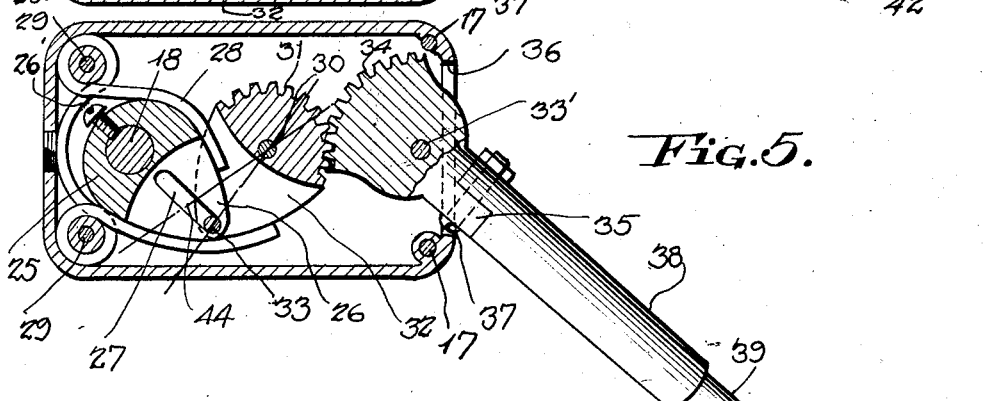
Figure 5 is a view similar to Figure 4 but with the parts shown in the position assumed when the head light is directing its beam to the right.

In operation it will be seen that shifting of the tie bar to the right or left will swing the segmental gear 34 in the opposite direction. This in turn will affect the segmental gear 31 and cause the pin 33 to move in the same direction as the tie bar 43. From an inspection of Figures 4 and 5 it will be seen that the pin 33, when the parts are centrally positioned, is at the front end of the slot 27 so that the lever ratio tending to turn the shaft 18 is great at this time and a slight angular movement of the pin 33 will produce a much greater angular movement of the shaft 18 thus causing the beam projected from the lamp 23 to swing more rapidly than the steering wheels and enabling the driver to observe the side of the road. As the movement of the wheels under the influence of the bar 43 approaches its end, the lever ratio will become more near uniform until a point, such as that indicated at 44 in Figure 5 has been reached. At this time the beam direction will have attained its practical maximum deviation and the pin 33 should be about the center of the slot 27. However, the steering wheels, under these conditions, have not yet reached their deviation and the bar 43 may be further moved to bring such steering wheels to the point of maximum deviation whereupon the pin 33 will pass to the rear end of the slot 27 with practically no change of appreciable extent in the direction of the beam. By this means the beam is swung in advance of the movement of the steering wheels to its maximum deviation and the steering wheels may be swung to their maximum deviation without materially affecting the position of the beam during the latter part of the swinging movement of said steering wheels.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In an operating mechanism for dirigible head lights, a vertical shaft for supporting a head light, a securing device for connecting the mechanism to the steering mechanism of a car, a second shaft parallel to the first, a pin and slot device operatively connecting the shafts and arranged to initially move the first shaft at a greater angular velocity than the second shaft and thereafter move the first shaft at a gradually decreasing angular ratio to the angular movement of the second shaft, said mechanism including a segmental gear on the second shaft, a third shaft, a segmental gear on the third shaft meshing with the first segmental gear, a pivot lug carried by the second gear, and a telescopic connecting device having one end connected to the pivot lug for vertical swinging movement and the other end provided with a ball and socket connection to said securing device.

2. In an operating mechanism for dirigible head lights, a vertical shaft for supporting a head light, a securing device for connecting the mechanism to the steering mechanism of a car, a second shaft parallel to the first, a boss on said first shaft, means for securing said boss on said shaft adjustably, a tongue projecting rearwardly from said boss and having a slot therein normally alined behind the axis of the boss, a second shaft, a segmental gear carried by the second shaft and provided with a fork embracing said tongue, a pin extending through the fork and slot, and an operative connection between the second shaft and said securing device.

3. In an operating mechanism for dirigible head lights, a vertical shaft for supporting a head light, a securing device for connecting the mechanism to the steering mechanism of a car, a second shaft parallel to the first, a boss on said first shaft, means for securing said boss on said shaft adjustably, a tongue projecting rearwardly from said boss and having a slot therein normally alined behind the axis of the boss, a segmental gear carried by the second shaft and provided with a fork embracing said tongue, a pin extending through the fork and slot, a third shaft, a segmental gear on the third shaft meshing with the first segmental gear, a pivot lug carried by the second gear, and a telescopic connecting device having one end connected to the pivot lug for vertical swinging movement and the other end provided with a ball and socket connection to said securing device.

In testimony whereof I affix my signature.

WILLIS M. SWEET.